Figure 1:
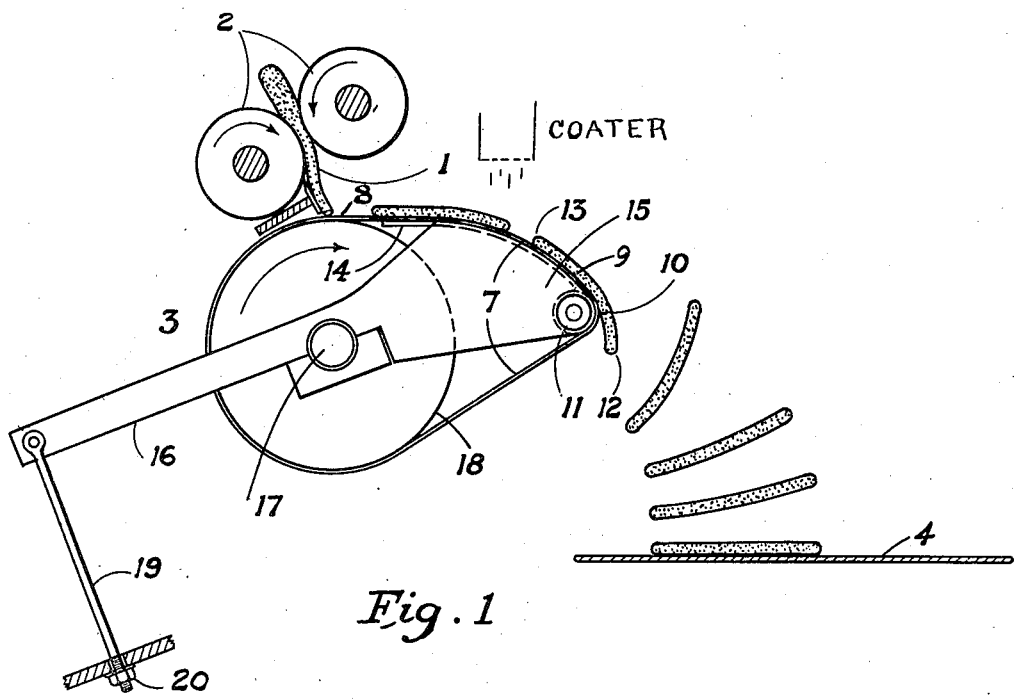

Dec. 25, 1945.  E. O. ENGELS  2,391,691
WORK PIECE DEPOSITOR FOR DOUGH MOLDERS
Filed June 19, 1944

INVENTOR
EUGENE O. ENGELS
BY
George B. Willcox
ATTORNEY.

Patented Dec. 25, 1945

2,391,691

UNITED STATES PATENT OFFICE 2,391,691

WORKPIECE DEPOSITOR FOR DOUGH MOLDERS

Eugene Oscar Engels, Saginaw, Mich., assignor to Baker Perkins Inc., Saginaw, Mich., a corporation of New York Application June 19, 1944, Serial No. 540,980

7 Claims. (Cl. 198—33)

This invention relates to improved means for depositing sheeted dough piece units on a moving conveyor apron in regular order one at a time.

My invention pertains more particularly to improvements over an earlier type of such transferring and- depositing devices wherein a moving element, for instance a revolving drum, has been encountered and impinged by each rolled-out dough piece emerging from a train of sheeting rolls, the purpose of such impact or moving contact being to flick the pieces into the air so as to cause them to turn over and land upside down on the traveling apron of a dough molding machine.

A typical example of such a dough molding machine is found in combined machines that are used in commercial bakeries for performing two or more distinct operations, such as sheeting, rolling the sheeted piece upon itself to form a scroll-like body; and rolling the body in such a way as to rotate the work about its own axis and give it a rolling motion transverse to its axis but not to give it at the same time a movement in the direction of this axis.

In certain bakery installations the rolled scrolls are removed from the machine and put into bake pans by hand and then charged into the oven, but in other installations the rolled work is discharged directly from the molding machine into bake pans that are put into receiving position by means of automatic panning devices that also serve to put loaded pans into the oven.

With such a combined molder and automatic panner it is important that the molder shall deliver every rolled work piece accurately into its pan while the pan is being held by means of the automatic panner. The work pieces must be alined lengthwise of the apron of the molding machine accurately one with another because if the work piece were to arrive at the pan a little out of line, unreliable performance of the panner would result because the piece would not drop centrally into the pan.

In practice the earlier drum type transfer device above alluded to can not be depended upon to unfailingly deliver work pieces from a sheeter to a molding machine apron in such a way that every piece would land on the belt in accurate alinement with every other piece and drop centrally into the pan on an automatic panner.

It is an object of my invention to provide a transpositor or dough piece transfer device that shall be capable of receiving dough pieces from any source, as a train of sheeting rolls, and shall deliver them onto the traveling apron of a molder in such exact alinement as to satisfy the accuracy requirements for delivery to an automatic panning device.

Another object is to provide such a transfer device with adjustable means adapted to increase or decrease the height of fall onto the moving apron of the molder, thereby permitting the dough piece to turn over more or less in the air, the purposes being to cause every portion of the area of the dough piece to strike the apron simultaneously or nearly so, and so avoid buckling, and also to bring the row of pieces on the apron into accurate register with the bake pans placed in predetermined position to receive them.

Another object is to provide a dough piece transfer device having a moving belt adapted to receive the dough pieces from a sheeter, the moving belt being arranged to impart the same linear velocity to all dough pieces and then to change the direction of the belt in such a way as to progressively reduce the adherence of each dough piece to the belt; finally to flick each piece into the air, causing them to turn upside down before landing on the conveyor, and also causing them to land in correct alined position one with another.

Another object is to provide a transpositor on which the sheeted work pieces shall be exposed right side up so they can be dusted with flour, sugar, spices, or other substances while in transit, and then be flicked upside down onto the molder apron, where they can be dusted on the other side before passing through the coiler and being delivered into the pans.

With the foregoing and certain other objects in view, which will appear later in the specifications, the invention is found in the novel construction, arrangement, and combination of means illustrated in the accompanying drawing and particularly pointed out in the appended claims. It will be understood, however, the claims are not intended to be limited to the form of the parts illustrated and described further than a limitation to the described form is necessary to distinguish them from the prior art.

Figure 2:
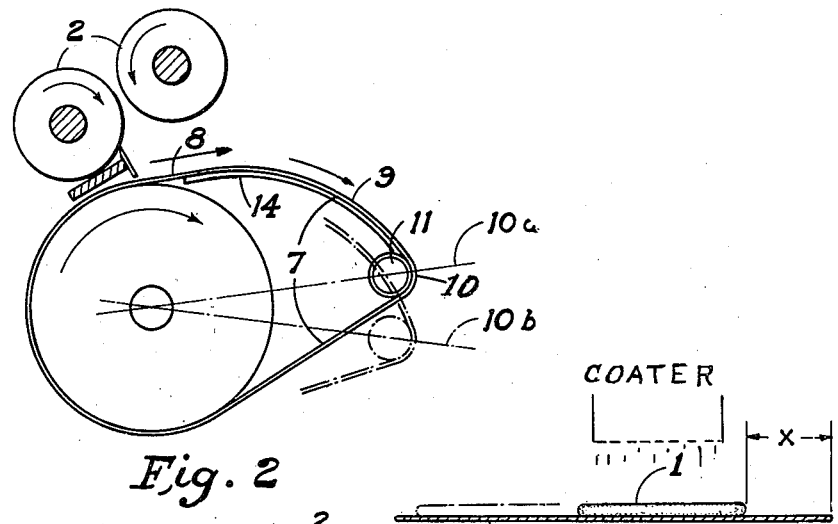
Figure 3:
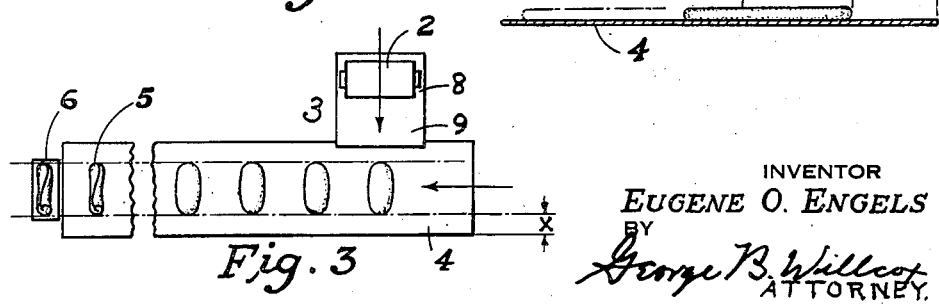

In the drawing Fig. 1 is a diagrammatic side view partly in section showing my invention in combination with a pair of sheeting rolls and a traveling apron of a molder, all arranged according to the plan diagram, Fig. 3; Fig. 2 is a diagrammatic side view similar to Fig. 1, indicating the relative vertical adjustment of the delivery end portion of the transfer device; and Fig. 3 is a diagrammatic plan view showing a sheeting roll, my dough piece transferring device, and the apron of a molder, the latter delivering the coiled dough pieces to a bake pan at the end of the apron; this arrangement illustrating a preferred application of my invention.

Flat soft pieces 1 may be delivered from the sheeting rolls 2, 2 through my transferring and depositing device designated in general by numeral 3. Depositor 3 delivers the work onto a molder apron 4, preferably running at right angles to the direction of delivery from the sheeter 2, 2, as indicated in the diagram Fig. 3. Apron 4 delivers the molded work 5 into the pans 6 of an automatic panner.

In use, each piece as it emerges from rolls 2, 2, is deposited on a short flexible conveyor belt 7 which is a part of my transfer device, and is located intermediate the place of delivery of sheeted pieces and the molder apron 4.

Belt 7 has means for directing and controlling the transfer of pieces to apron 4 as regards their landing on the apron flatwise; that is to say, without folding or buckling, and also in respect to their accurate alinement transversely of the apron, as will be set forth.

Specifically, the path of travel of the sheeted dough pieces on belt 7 is determined by the top run. Its travel is at first straight toward the right, as indicated by arrow 8, Fig. 2, and then goes in a general downwardly oblique direction along a bowed path at 9, to the end 10 of the run.

In practice the uniformity and accuracy with which work pieces land on apron 4, and also their alinement thereon are improved by shaping the path of travel of the belt portion 9 to the general form shown in Figs. 1 and 2.

Under conditions of use the straight portion 8 travels toward the right for a short distance, then describes the curve 9 which is convex upwardly, but as a whole slopes obliquely downward to the end of the run, at 10. Belt 7 is driven at a speed suitable to cause dough pieces to be flicked from its end 10 and to land upside down and as nearly flatwise as possible upon apron 4. This must be done in such a way that the pieces when carried on the apron shall be alined accurately in the direction of its length as indicated by broken lines, Fig. 2.

It is desirable to maintain uniform speed of belt 7 in order to establish reasonably accurate alinement on apron 4 and so enable still better alinement to be maintained by a simple up-and-down adjustment of the delivery end 10. Such adjustment of end 10 is indicated in Fig. 2 by dotted line positions, where 10a indicates a raised position and 10b a lowered position. Such finer adjustments accommodate for changes in quality of dough and other conditions of use.

The way in which transfer belt 7 handles the dough piece 1 during its transfer from the sheeting rolls 2 to molder apron 4 is substantially as follows:

Dough piece 1 is delivered flatwise onto the straight portion 8 and immediately picks up the full speed of belt travel. It is this steady speed which is used to flick the dough pieces uniformly into the air from the belt at the end of the run.

This is done in a positive and exact manner, since the dough piece has opportunity to establish complete contact with the straight portion 8 before running over the bowed part 9. With such contact the speed of every piece is the same as the speed of every other. Part 9, curved as shown, gives the dough piece a slight but progressively increasing centrifugal tendency to leave the belt by continuing in a straight line of travel while the belt diverges therefrom. Such tendency is not enough to actually separate the work from the belt, but does reduce the contact between the two so the work will not adhere unduly when it arrives at 10, the point of discharge.

At 10 the belt 7 passes around a small end piece or nosing, for example, idle roller 11, spaced laterally from the roll 18 and located horizontally intermediate the roll 18 and the place of deposit on the apron 4. When the advancing end 12 of the work arrives at the end of the run and projects downward free from contact with the belt at 10, the trailing part 13 of the dough piece receives from the belt at the nosing just the right impetus to flick it away from the belt and cause it to turn upside down in the air and land flatwise on apron 4.

As has been stated, every dough piece will receive at 8, Fig. 2, the same linear velocity and at 9 assumes a tendency to release itself from contact with the belt. To insure that every dough piece delivered from apron 4 shall be discharged in accurate register with the pans 6, Fig. 3, it is desirable to employ simple up-and-down adjustment means for delivery end 10, such as is indicated by the broken lines, Fig. 2.

Having described the general arrangement and functions of my transfer device, reference may now be had to Fig. 1, where suitable mounting and adjusting means for the transfer belt 7 are shown, as follows.

The curved portion 9 is kept to its bowed path, and is prevented from vibrating in use, by means of a curved guide 14, which may be a bowed sheet or plate mounted between the top peripheries of the roll 18 and nosing 11. This plate 14 is mounted on a frame 15. At the end of the frame is mounted the small idle roller 11. The frame has a rearwardly extending member 16 and is pivotally supported on, for example, a driven shaft 17 that may be powered by any suitable means, not shown. On shaft 17 is a large rotatable roll 18, upon which belt 7 is mounted.

At the end of member 16 is a link 19 having a screw thread and nut 20 for angularly adjusting the member 16 and raising and lowering the small roller 11 and the end 10 of belt 7; thereby appropriately placing the transfer device to suit the size, weight, and adhesive characteristics of the dough pieces, and to control their fall to make them land flatwise on the apron 4.

The same adjustment increases or decreases the distance X, Figs. 2 and 3, and thus shifts the position of the row of pieces transversely of apron 4 so as to bring the row into line with the bake pans 6.

Thereafter all pieces will be delivered accurately at the end of the apron and will be discharged therefrom in a precisely centered manner into bake pans 6 when the pans are positioned by an automatic panner, or otherwise.

Means designated by the legend "Coater" is provided for applying flour or any other desired material to the top of each sheeted dough piece, as shown in Fig. 1, and a second similar means is shown in Fig. 3 for applying the same or a different material to the other side of the same piece.

Having thus described my invention, what I claim and desire to secure by Letters Patent is:

1. A dough piece transpositor adapted to be mounted below a source of sheeted dough pieces and above a traveling apron of a dough molder; said transpositor comprising a power-driven roll; a nosing spaced laterally from said roll and above said apron; a flexible belt mounted on said roll and nosing; a belt-guiding member mounted between the top peripheries of the said roll and nosing, a portion of said member extending substantially straight away from the top periphery of the driven roll, another portion being bowed and extending downwardly in substantially oblique direction; the top run of said belt being slidable on said guiding member and constrained to a path of travel that diverges from the direction of said straight-away portion in progressively increasing degree.

2. A dough piece transpositor adapted to be mounted below a source of sheeted dough pieces and above a traveling apron of a dough molder; said transpositor comprising a power-driven roll; a nosing spaced laterally from said roll and above said apron; a flexible belt mounted on said roll and nosing; a belt-guiding member mounted between the top peripheries of the said roll and nosing; a unitary frame tiltably mounted on a stationary support and carrying the assembly comprising said nosing, belt-guiding member and roll; the top run of said belt being slidable on said guiding member and constrained to a path of travel that diverges from the direction of said straight-away portion in progressively increasing degree.

3. A dough piece transpositor adapted to be mounted below a source of sheeted dough pieces and above a traveling apron of a dough molder; said transpositor comprising a power-driven roll; a nosing spaced laterally from said roll and above said apron; a flexible belt mounted on said roll and nosing; a belt-guiding member mounted between the top peripheries of the said roll and nosing; a unitary frame tiltably mounted on a stationary support and carrying the assembly comprising said nosing, belt, belt-guiding member and roll; and frame-adjusting means adapted to raise or lower said nosing relatively to the roll.

4. A dough pieces transpositor comprising a power-driven roll; a nosing spaced laterally from said roll and above said apron; a flexible belt mounted on said roll and nosing; a belt-guiding member mounted between the top peripheries of the said roll and nosing; a frame tiltably mounted on a stationary support and carrying the assembly comprising said nosing, belt, belt-guiding member and roll; and frame-adjusting means adapted to raise or lower said nosing relatively to the power-driven roll, comprising a member extending from the frame and devices adapted to secure said member and frame in various angularly adjusted positions.

5. A dough piece transpositor adapted to be mounted below a source of sheeted dough pieces and above a traveling apron of a dough molder; said transpositor comprising a power-driven roll; a nosing spaced laterally from said roll and above said apron; a flexible belt mounted on said roll and nosing; a belt-guiding member mounted between the top peripheries of the said roll and nosing; a unitary frame tiltably mounted on a stationary support and carrying the assembly comprising said nosing, belt, belt-guiding member and roll; the top run of said belt being slidable on said guiding member and constrained to a path of travel that diverges from the direction of said straight-away portion in progressively increasing degree.

6. In a transpositor for dough pieces and the like, a traveling conveyor belt having a top run presenting an initial straight portion and a bowed portion sloping obliquely downward from the terminal part of said straight portion in an arcuate path, a nosing situated within said run at the discharging end thereof; the said arcuate path diverging from the direction of travel of said straight portion in progressively increasing degrees of curvature, and means adapted to impart to said upper run speed appropriate to cause dough pieces to be flicked off at the delivery end of the run at the nosing so as to turn upside down in flight.

7. A structure as set forth in claim 6 having means adapted to raise and lower the delivery end of said run.

EUGENE OSCAR ENGELS.